United States Patent
Jahn

(10) Patent No.: US 11,296,521 B2
(45) Date of Patent: Apr. 5, 2022

(54) SYSTEM FOR CONTACTLESSLY TRANSMITTING ELECTRICAL ENERGY TO A MOBILE PART WHICH CAN BE MOVED ON THE FLOOR OF A SYSTEM

(71) Applicant: SEW-EURODRIVE GMBH & CO. KG, Bruchsal (DE)

(72) Inventor: Nils-Malte Jahn, Heidelberg (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 130 days.

(21) Appl. No.: 16/757,749

(22) PCT Filed: Oct. 8, 2018

(86) PCT No.: PCT/EP2018/025260
§ 371 (c)(1),
(2) Date: Apr. 20, 2020

(87) PCT Pub. No.: WO2019/076482
PCT Pub. Date: Apr. 25, 2019

(65) Prior Publication Data
US 2021/0111572 A1    Apr. 15, 2021

(30) Foreign Application Priority Data
Oct. 20, 2017    (DE) .................. 10 2017 009 793.3

(51) Int. Cl.
*H02J 7/00*    (2006.01)
*H02J 50/90*    (2016.01)
(Continued)

(52) U.S. Cl.
CPC ............ *H02J 7/0042* (2013.01); *H01F 27/28* (2013.01); *H02J 7/02* (2013.01); *H02J 50/005* (2020.01);
(Continued)

(58) Field of Classification Search
CPC .......... H02J 7/0042; H02J 7/02; H02J 50/005; H02J 50/10; H02J 50/90; H02J 2207/20;
(Continued)

(56) References Cited

U.S. PATENT DOCUMENTS 10,965,155 B2 *   3/2021   Jahn ................. H02J 50/005
11,101,692 B2 *   8/2021   Soder ............... H02J 50/005
(Continued)

FOREIGN PATENT DOCUMENTS

DE    102009057437 A1    6/2011
DE    102011119606 B3    4/2013
EP         3185395 A1    6/2017

*Primary Examiner* — Paul Dinh
(74) *Attorney, Agent, or Firm* — Carter, Deluca & Farrell LLP

(57) ABSTRACT

In a system for contactlessly transmitting electrical energy to a mobile part movable on a floor, a stepped bore is provided in the floor. A frame part is situated on the step of the stepped bore. A charge unit is accommodated by the frame part and has a receiving part situated between upper and lower cover parts. A primary winding is situated on the inner side of the upper cover part and is fed by an electronic circuit supplied with electrical energy with the aid of a cable that is at least partially accommodated in a cable-routing part.

The cable-routing part is situated in a groove having a radial extension in relation to, and guided through the step of, the stepped bore, so that the cable is routed underneath the step of the stepped bore.

19 Claims, 2 Drawing Sheets

(51) Int. Cl.
*H02J 50/10* (2016.01)
*H02J 50/00* (2016.01)
*H01F 27/28* (2006.01)
*H02J 7/02* (2016.01)

(52) U.S. Cl.
CPC .............. *H02J 50/10* (2016.02); *H02J 50/90* (2016.02); *H02J 2207/20* (2020.01)

(58) Field of Classification Search
CPC .......... H01F 27/28; H01F 27/02; H01F 27/40; H01F 38/14; H02G 3/22
USPC ....................................................... 320/108
See application file for complete search history.

(56) References Cited

U.S. PATENT DOCUMENTS

| | | |
|---|---|---|
| 2014/0361635 A1 | 12/2014 | Ookawa et al. |
| 2015/0167340 A1* | 6/2015 | Niizuma .................. E04H 6/22 414/231 |
| 2015/0244182 A1 | 8/2015 | Ozana et al. |
| 2016/0236577 A1* | 8/2016 | Krammer ................ H01F 38/14 |

* cited by examiner

SYSTEM FOR CONTACTLESSLY TRANSMITTING ELECTRICAL ENERGY TO A MOBILE PART WHICH CAN BE MOVED ON THE FLOOR OF A SYSTEM

FIELD OF THE INVENTION

The present invention relates to a system for contactlessly transmitting electrical energy to a mobile part which can be moved on the floor of a system.

BACKGROUND INFORMATION

In certain conventional systems, it is possible to transmit electrical energy via inductive coupling.

SUMMARY

Example embodiments of the present invention provide a charge unit, which is easy to produce, for a mobile part that is able to be moved in the system.

According to example embodiments of the present invention, a system is provided for contactlessly transmitting electrical energy to a mobile part which can be moved on a floor of a system. A stepped bore is introduced into, in particular situated in, the floor material of the floor, and a frame part is situated, in particular resting, on the step of the stepped bore. A charge unit is accommodated by the frame part, and the charge unit has a receiving part, which is situated between an upper cover part and a lower cover part. A primary winding is situated on the inner side of the upper cover part, and the primary winding is fed by an electronic circuit, which is supplied with electrical energy with the aid of a cable. The cable is at least partially accommodated in a cable-routing part, and the cable-routing part is situated in a groove that has a radial extension in relation to the stepped bore, in particular from the center axis of the bore. The groove is guided through the step of the stepped bore, so that the cable is routed underneath the step of the stepped bore. In the particular first region in which the cable-routing part is accommodated, the groove is broader, in particular, in the circumferential direction, than in a radially more remote second region, in particular, broader than in a second region situated radially farther outside, the radial distance range covered by the second region, in particular, being greater than the radial distance range covered by the first range, the groove, in particular, being situated in the second region above the step.

This has the advantage that a cable-routing part is able to be introduced into the first region so that the cable routed through the second region of the groove is able to be routed into the deeper region of the stepped bore.

According to example embodiments, a secondary winding is situated on the underside of the mobile part, which is able to be inductively coupled to the primary winding by reaching an area in the driving surface. This offers the advantage that once the position of sufficient inductive coupling or optimal coupling between the primary winding and the secondary winding is reached, electrical power is able to be supplied to the mobile part via the inductive coupling. This makes it possible to charge an energy store of the mobile part. Due to the arrangement as a stepped bore, the secondary winding and the primary winding may be provided in the form of ring windings, which are aligned coaxially with each other during the charging process. This even allows the mobile part to rotate, the axis of rotation being aligned parallel and even coaxially with respect to the center axis and/or the bore axis of the stepped bore. As a result, the mobile part may be equipped with an omnidirectional drive or a tracked drive so that the mobile part is able to turn on the spot while unobstructed charging is able to be carried out nevertheless despite the rotation.

Thus, it is considered advantageous that the rotational symmetry of the stepped bore is provided and the cable for the supply of an electronic circuit supplying the primary part is able to be routed into the space area of the stepped bore in a protected manner.

According to example embodiments, the cable is introduced into the charge unit through a screwed cable gland that is situated on the lower cover part. This has the advantage of allowing for a sealed cable feed.

According to example embodiments, the cable-routing part has a wing region which projects in the circumferential direction from a base section, i.e., a base area, of the cable-routing part, the wing region restricting the cable-routing part in the groove direction, i.e., thereby particularly restricting the cable-routing part from moving into the groove. This has the advantage that the wing region projects in the circumferential direction and thus rests against the wall of the stepped bore and thereby restricts the cable-guiding part from moving into the groove.

According to example embodiments, the radial distance range covered by the base section encompasses the radial distance range covered by the frame part and/or the step. This offers the advantage that the base section is inserted into the groove and the cable-routing part is thus connected to the concrete material of the floor in a form-fitting manner and the cable is routed into the interior of the stepped bore, i.e., to a smaller radial distance, and consequently is protected in comparison to the inner diameter of the frame part. As a result, the cable is able to be protected from the effects of the frame part.

According to example embodiments, the radial distance range covered by the base section overlaps with the radial distance range covered by the first region of the groove. This has the advantage that the base section is inserted into the groove and the cable-routing part is thus connected to the concrete material of the floor in a form-fitting manner.

According to example embodiments, the upper cover part is tightly connected to the receiving part, in particular using screws, and/or the lower cover part is tightly connected to the receiving part, in particular using screws. This has the advantage that the space area surrounded by the receiving part, by the upper cover part and by the lower cover part.

According to example embodiments, an electronic circuit is situated in the space area surrounded by the receiving part together with the upper cover part and the lower cover part, in particular, in the manner of a housing. The electronic circuit is, for example, supplied with electrical power by the cable, and the primary winding is fed by the electronic circuit. The electronic circuit may include a power inverter which injects a current into the primary winding via a gyrator. This offers the advantage that the electronic circuit is able to be positioned in a protected manner. The current injection may be achieved with the aid of the gyrator so that high efficiency is achievable even if the inductive coupling is fluctuating.

According to example embodiments, the upper cover part is made of plastic, in particular, plastic that is transparent to light, especially such that a display is visible from the direction of the driving surface, the electronic circuit, in particular, including the display. This has the advantage that a protected display is able to be used, which is easy to produce.

According to example embodiments, the region covered by the stepped bore in the bore direction, i.e., in particular, the region covered by the stepped bore from the direction of the driving surface in the direction of the center axis of the stepped bore, covers the region covered in the bore direction by a reinforcement situated in the floor material. This has the advantage that the stepped bore may be provided deeper than one of the reinforcements in the floor. As a result, a stable installation is possible, and the deepest possible level is achievable for accumulated water.

According to example embodiments, the frame part has adjustment screws on its side facing the step, for the alignment of the frame part. This offers the advantage of allowing for a flush alignment of the charge unit.

According to example embodiments, the frame part has a radial outer edge region, which is circumferential in the circumferential direction and projects toward the driving surface so that the charge unit is accommodated in the receiving part in a centered manner. This is considered advantageous insofar as the accommodation and the centering are able to be carried out in an uncomplicated manner.

According to example embodiments, the floor has floor material on which a coating is provided, the surface of which functions as a driving surface for the mobile part. This has the advantage that the coating may be provided not only on the floor material but also on the upper cover part of the charge unit.

According to example embodiments, the upper cover part is situated flush with the driving surface, i.e., the top surface of the cover part is in alignment with the driving surface, in particular. This is considered advantageous since it allows for unobstructed driving over the upper cover part.

Further features and aspects of example embodiments of the present invention are described in greater detail below with reference to the appended Figures.

DETAILED DESCRIPTION

Figure 1:
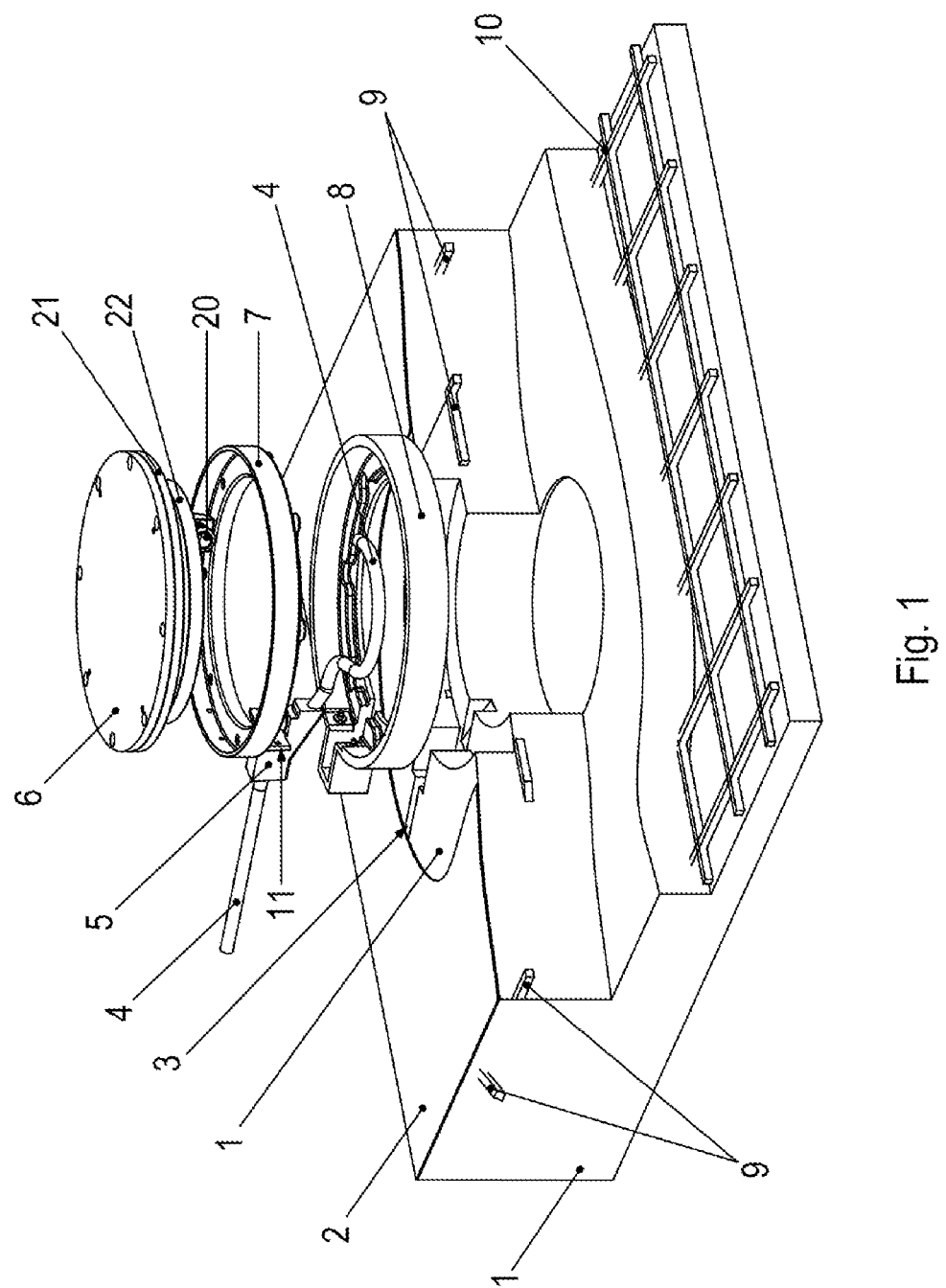
FIG. 1 is an exploded view of the stationary part of a system for contactlessly transmitting electrical energy to a mobile part according to an example embodiment of the present invention.
Figure 2:
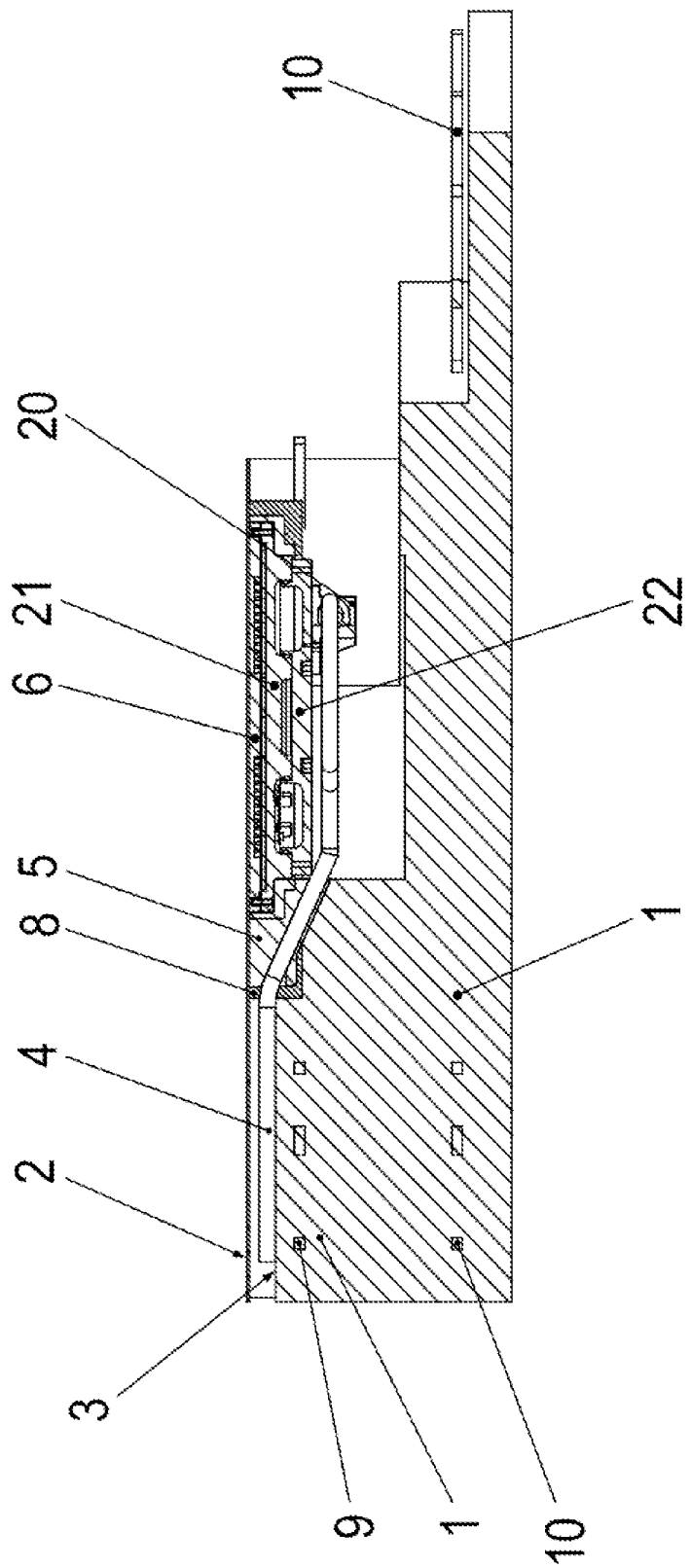
FIG. 2 is a cross-sectional view of the part.

As illustrated in the Figures, the mobile part is able to drive on a driving surface of a system, the driving surface being formed by the surface of coating 2 of a floor material 1.

A charge unit is situated in a recess of floor material 3.

For this purpose, the recess is arranged in the form of a stepped bore in floor material 3, which penetrates at least a first reinforcement 9. At least the first reinforcement 9 and a second reinforcement 10 are situated in floor material 1, each reinforcement substantially being disposed in a plane that extends parallel to the surface of the coating and/or the driving surface. Reinforcements 9 and 10 are made of steel, in particular, of a grid-shaped system of steel rods.

First reinforcement 9 is set apart from coating 2.

The depth of the recess exceeds the depth of first reinforcement 9.

Placed on the step of the steeped bore is a frame part 7, which is integrally connected to floor material 1 by casting compound 8 disposed between the floor material and frame part 7.

Accommodated in frame part 7, which has an annular configuration, is a charge unit, which includes a receiving part 21 that at least partially surrounds a space area in the manner of a housing, the space area being restricted on its upper side by a cover part 6 and at its underside by a lower cover part 22. Cover part 6 is connected to receiving part 21, and lower cover part 22 is also connected to receiving part 21. Receiving part 21 is situated between cover part 22 and lower cover part 6 so that lower cover part 22 is set apart from cover part 6.

Cover part 6 is, for example, made of plastic. Situated on the underside of cover part 6 are depressions, in particular grooves, into which the primary winding is inserted. Cover part 6 ends flush with the driving surface, i.e., the surface on which coating 2 is situated on the floor material, so that the mobile part is able to drive over cover part 6.

An electronic circuit for feeding the primary winding is accommodated in the space area. Thus, the electronic circuit is surrounded by receiving part 21, upper cover part 6, and lower cover part 22 in the manner of a housing. The electronic circuit has a power inverter, the connector of which on the DC-voltage side is connected to the input of a quadripole arranged as a gyrator, while the output of this quadripole is connected to the primary winding, a capacitance being connected to the primary winding in series or parallel, such that the natural frequency of the thereby created oscillating circuit is similar to the frequency of the alternating voltage supplied at the connector of the power inverter on the alternating-voltage side.

In addition, the components such as the capacitance and inductivity of the gyrator, are likewise resonantly adapted to the frequency.

In this manner, the power inverter functions as a voltage source, but the primary winding is supplied in the manner of a current source because the quadripole converts the voltage-source-type behavior of its feed provided on the input side into a current-source-type behavior on its output side.

The primary winding is, for example, inserted into a depression that extends on the inner side of upper cover part 6 in the form of a rectangular spiral.

A groove 3 is introduced into floor material 1, which extends in a radial direction with respect to the stepped bore. Groove 3 is, for example, cut into the surface of concrete material 1.

After cable 4 has been inserted into the groove, groove 3 is filled with casting compound, and coating 2 is then applied on top of the casting compound and concrete material 1.

In the region where groove 3 terminates into the stepped bore, groove 3 extends at a decreasing distance from the stepped bore with increasing depth. A linear cant may be provided for this purpose.

Directly adjacent to the stepped bore, the groove has a broader configuration in a first radial distance range than radially outside this radial distance range.

A base section of cable-routing part 5 is situated in the broader groove. Wing regions 11 are provided on the base section, which cover a circumferential angular range in the circumferential direction that encompasses the circumferential angular range covered by the broader groove.

Wing regions 11 therefore restrict routing part 5 in the radial direction. Cable 4 is radially guided through routing part 5. Since the base section is situated in the broader groove, routing part 5 is restricted in the circumferential direction, and, in particular, is connected to floor material 1 in a form-fitting manner.

The base section also projects from the broader groove into the stepped bore. The radial clearance range covered by the base section covers the radial distance range covered by the step of the stepped bore. The base section terminates in the stepped bore underneath the step and thus also introduces cable 4 into the stepped bore underneath the step. The cable extends in the stepped bore to screwed cable gland 20 and into the charge unit there.

The stepped bore has a larger inner diameter above the step than underneath the step.

The broader groove cuts through the step in order to accommodate the base section.

The step is situated at approximately the same depth as first reinforcement 9.

Frame part 7, for example, has adjustment screws on its underside, so that it rests on the step via these adjustment screws and is able to be aligned by operating the screws. A flush alignment of the charge unit with respect to the surrounding driving surface is possible in this manner. With the aid of subsequently introduced casting compound 8, a fixation of frame part 7 is brought about after the casting compound has cured.

Frame part 7 also has a circumferential radial outer edge that extends in an upward direction so that the charge unit is easily able to be accommodated and centered. The charge unit is, for example, connected to the frame unit with the aid of screws.

Because of the preassembled production of the charge unit, a simple assembly is possible. For this assembly, cable 4 has to be routed through screwed cable gland 20 and be electrically connected before the charge unit is placed in frame part 7. An introduction of the charge unit into frame part 7 will then be possible.

In further exemplary embodiments, a carrier, which holds the primary winding, is accommodated instead of the groove on the underside of the upper cover part.

LIST OF REFERENCE NUMERALS 1 floor material, in particular concrete material
2 coating
3 groove
4 cable
4 cable-routing part
6 cover part
7 frame part
8 casting compound
9 first reinforcement
10 second reinforcement
11 wing area
20 screwed cable gland
21 receiving part
22 lower cover part

The invention claimed is:

1. A system for contactlessly transmitting electrical energy to a mobile part that is movable on a floor, a stepped bore being provided in a floor material of the floor, comprising:
 a frame part adapted to be located on a step of the stepped bore;
 a charge unit accommodated by the frame part and including a receiver part arranged between an upper cover part and a lower cover part;
 a primary winding provided on an inner side of the upper cover part and adapted to be fed by an electronic circuit supplied with electrical energy via a cable; and
 a cable-routing part adapted to at least partially accommodate the cable and arranged in a groove having a radial extension in relation to the stepped bore, the groove adapted to be guided through the step of the stepped bore, the cable being routable underneath the step of the stepped bore;
 wherein, in a first region in which the cable-routing part is accommodated, the groove is broader, in a circumferential direction, than in a radially more remote second region, a radial distance range covered by the second region being greater than a radial distance range covered by the first range, the groove being arranged in the second region above the step.

2. The system according to claim 1, wherein the frame part is adapted to rest on the step of the stepped bore.

3. The system according to claim 1, wherein the groove has a radial extension from a center axis of the stepped bore.

4. The system according to claim 1, wherein a secondary winding is arranged on the underside of the mobile part adapted to be inductively coupled to the primary winding by reaching an area in a driving surface.

5. The system according to claim 1, wherein the cable extends into the charge unit through a screwed cable gland that is provided on the lower cover part.

6. The system according to claim 1, wherein the cable-routing part includes a wing region which projects in the circumferential direction from a base section of the cable-routing part, the wing region adapted to restrict the cable-routing part in a groove direction to restrict the cable-routing part from moving into the groove.

7. The system according to claim 6, wherein a radial distance range covered by the base section encompasses a radial distance range covered by the frame part and/or the step.

8. The system according to claim 6, wherein a radial distance range covered by the base section overlaps with a radial distance range covered by the first region of the groove.

9. The system according to claim 1, wherein the upper cover part and/or the lower cover part is tightly and/or screw-connected to the receiver.

10. The system according to claim 1, wherein the electronic circuit is arranged in a space area surrounded by the receiver part, the upper cover part, and the lower cover part, the electronic circuit adapted to be supplied with electrical power by the cable, the electronic circuit adapted to feed the primary winding, the electronic circuit including a power inverter adapted to inject a current into the primary winding via a gyrator.

11. The system according to claim 1, wherein the upper cover part is formed of plastic.

12. The system according to claim 1, wherein the upper cover part is formed of transparent plastic, the electronic circuit including a display that is visible through the transparent plastic of the upper cover part from a direction of a driving surface.

13. The system according to claim 1, wherein a region covered by the stepped bore in a bore direction and/or a region covered by the stepped bore from a direction of a driving surface in a direction of a center axis of the stepped bore encompasses a region covered by a reinforcement situated in the floor material in the bore direction.

14. The system according to claim 1, wherein the frame part includes adjustment screws on a side facing the step adapted to align the frame part.

15. The system according to claim 1, wherein the frame part includes a radial outer edge region which is circumferential in the circumferential direction and projects toward a driving surface so that the charge unit is accommodated in the receive part in a centered manner.

16. The system according to claim 1, wherein a coating is provided on the floor material of the floor, a surface of which is arranged as a driving surface for the mobile part.

17. The system according to claim 1, wherein the upper cover part is adapted to be arranged flush with a driving surface.

18. The system according to claim 17, wherein a top surface of the upper cover part is adapted to be arranged in alignment with the driving surface.

19. A system for contactlessly transmitting electrical energy to a mobile part movable on a floor, a stepped bore being provided in a floor material of the floor, comprising:

- a frame part located on a step of the stepped bore;
- a charge unit is accommodated by the frame part and including a receiver part arranged between an upper cover part and a lower cover part; and
- a primary winding provided on an inner side of the upper cover part and adapted to be fed by an electronic circuit supplied with electrical energy via a cable at least partially accommodated in a cable-routing part, the cable-routing part arranged in a groove that has a radial extension in relation to the stepped bore, the groove being guided through the step of the stepped bore, the cable being routed underneath the step of the stepped bore;
- wherein a first region in which the cable-routing part is accommodated, the groove is broader than in a radially more remote second region, a radial distance range covered by the second region being greater than a radial distance range covered by the first range, the groove being situated in the second region above the step.

* * * * *